United States Patent
Brown et al.

(10) Patent No.: US 11,657,842 B2
(45) Date of Patent: May 23, 2023

(54) TAPE DRIVE WITH HEAD-GIMBAL ASSEMBLY AND CONTACT PLATE

(71) Applicant: Western Digital Technologies, Inc., San Jose, CA (US)

(72) Inventors: Diane L. Brown, San Jose, CA (US); Trevor W. Olson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/697,861

(22) Filed: Mar. 17, 2022

(65) Prior Publication Data

US 2022/0208224 A1    Jun. 30, 2022

Related U.S. Application Data

(60) Division of application No. 17/230,654, filed on Apr. 14, 2021, now Pat. No. 11,315,593, which is a (Continued)

(51) Int. Cl.
*G11B 5/56*    (2006.01)
*G11B 15/32*   (2006.01)
(Continued)

(52) U.S. Cl.
CPC ............ *G11B 5/56* (2013.01); *G11B 5/00813* (2013.01); *G11B 5/581* (2013.01); *G11B 5/60* (2013.01); *G11B 15/32* (2013.01); *G11B 15/43* (2013.01)

(58) Field of Classification Search
None
See application file for complete search history.

(56) References Cited

U.S. PATENT DOCUMENTS 5,191,492 A *   3/1993   Nayak .................... G11B 5/588
5,481,417 A     1/1996   Yokoyama et al.
(Continued)

FOREIGN PATENT DOCUMENTS

EP    0743548 A2   11/1996
EP    0844610 A1    5/1998
(Continued)

OTHER PUBLICATIONS

Hayes "Effect of Magnetic Tape Thickness on Durability and Lateral Tape Motion Measurement and Modeling in a Linear Tape Drive," Thesis, The Ohio State University, 2006, 129 pages, <https://nlbb.engineering.osu.edu/sites/nlbb.osu.edu/files/uploads/hayes_thesis.pdf>.

(Continued)

*Primary Examiner* — William J Klimowicz
(74) *Attorney, Agent, or Firm* — Patterson + Sheridan, LLP; Steven H. VerSteeg

(57) ABSTRACT

The present disclosure generally relates to a tape embedded drive having a head-gimbal assembly (HGA) and a contact plate. By using a support structure or contact plate beneath the tape, read and write heads can be designed to be narrower than the tape. The support structure or contact plate can stretch or relax the tape so that the spacing between servo tracks on the tape corresponds to the servo to servo spacing on the head. HGAs, which are narrower than the tape, can fly over the tape and read data from and write data to the tape. The HGA can have a single head or multiple heads. Additionally, multiple independent head assemblies can also be used for reading from and writing to the same tape.

20 Claims, 8 Drawing Sheets

Related U.S. Application Data continuation of application No. 16/864,050, filed on Apr. 30, 2020, now Pat. No. 11,087,786.

(51) Int. Cl.
  *G11B 5/008* (2006.01)
  *G11B 5/60* (2006.01)
  *G11B 5/58* (2006.01)
  *G11B 15/43* (2006.01)

(56) References Cited

U.S. PATENT DOCUMENTS

| | | | |
|---|---|---|---|
| 5,793,573 | A | 8/1998 | Eckberg et al. |
| 5,978,188 | A * | 11/1999 | Kaaden ................ G11B 15/602 |
| 6,137,659 | A | 10/2000 | Warmenhoven |
| 6,236,526 | B1 * | 5/2001 | Hoekstra ............... G11B 33/025 |
| 6,565,028 | B2 | 5/2003 | Sasaki et al. |
| 6,676,070 | B2 | 1/2004 | Sawtelle |
| 6,714,381 | B2 | 3/2004 | Willems, Jr. |
| 6,886,766 | B1 | 5/2005 | Weng et al. |
| 7,054,101 | B1 | 5/2006 | Marion et al. |
| 7,133,261 | B2 | 11/2006 | Biskeborn |
| 7,195,189 | B2 | 3/2007 | Biskeborn |
| 7,261,250 | B1 | 8/2007 | Underkofler et al. |
| 7,486,464 | B2 | 2/2009 | Saliba |
| 7,609,475 | B2 | 10/2009 | Biskeborn et al. |
| 8,937,786 | B1 | 1/2015 | Herget |
| 9,001,464 | B2 | 4/2015 | Lakshmikumaran et al. |
| 9,183,863 | B2 | 11/2015 | Herget |
| 9,251,821 | B1 | 2/2016 | Harper et al. |
| 9,355,663 | B1 | 5/2016 | Harper et al. |
| 11,081,132 | B1 | 8/2021 | Chew |
| 11,087,786 | B1 | 8/2021 | Brown et al. |
| 2004/0001284 | A1 | 1/2004 | Nayak et al. |
| 2005/0135017 | A1 | 6/2005 | Biskeborn |
| 2007/0008683 | A1 * | 1/2007 | Gavit ................ G11B 33/1406 206/307 |
| 2008/0068753 | A1 | 3/2008 | Biskeborn et al. |
| 2010/0039731 | A1 | 2/2010 | Bortz et al. |
| 2020/0258544 | A1 * | 8/2020 | Kobayashi ........... G11B 21/027 |

FOREIGN PATENT DOCUMENTS

| | | | |
|---|---|---|---|
| EP | 3693967 A1 * | 8/2020 | ............. B41J 2/345 |
| JP | H09282736 A | 10/1997 | |
| JP | 2005259198 A | 9/2005 | |
| JP | 2006012223 A | 1/2006 | |
| JP | 2006048877 A | 2/2006 | |

OTHER PUBLICATIONS

Panda et al. "Control and Operation of Reel-to-Reel tape Drives without Tension Transducer," Microsystem Technologies, vol. 10, No. 1, Dec. 2003, pp. 53-59.

Raeymaekers et al. "A Model for Magnetic Tape/Guide Friction Reduction by Laser Surface Texturing," Tribology Letters, 2007, vol. 28, pp. 9-17, <https://doi.org/10.1007/s11249-007-9242-9>.

* cited by examiner

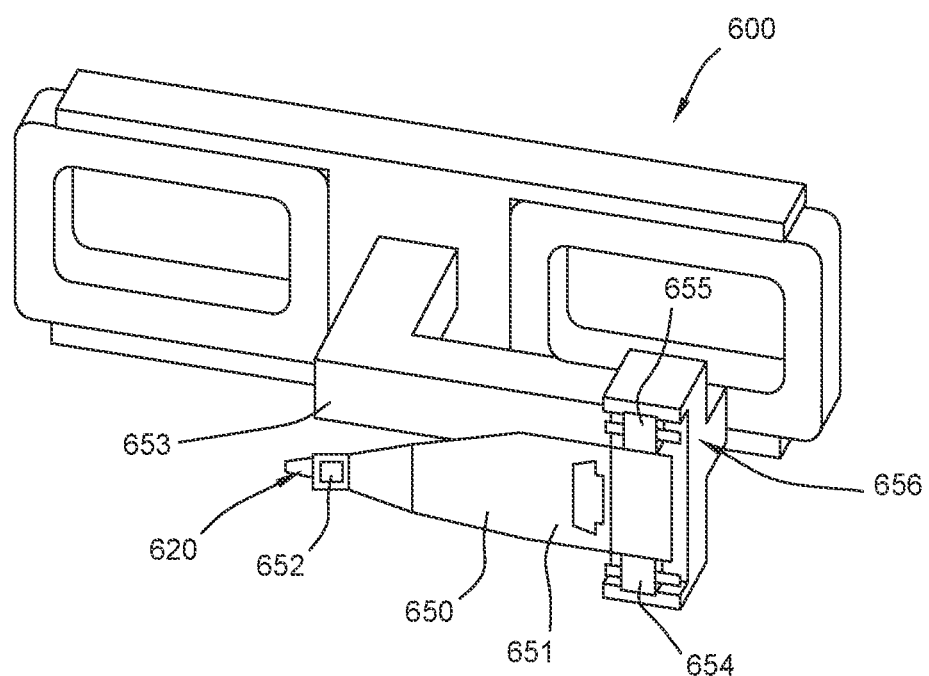
FIG. 6A
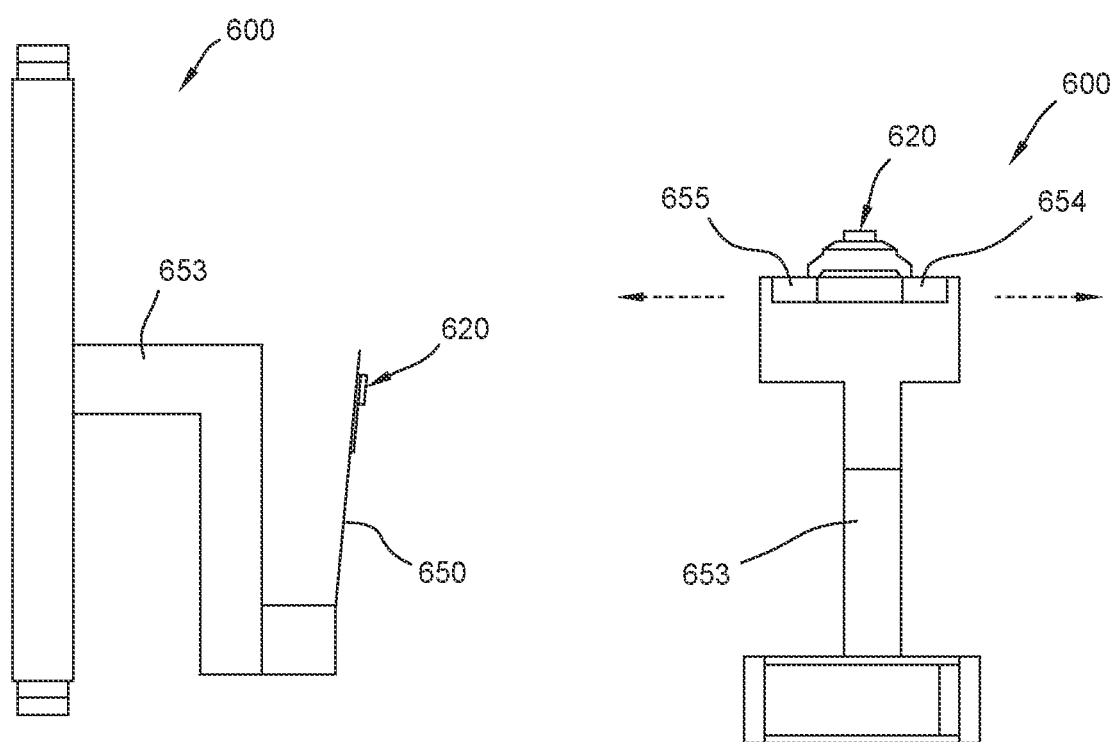
FIG. 6B
FIG. 6C

TAPE DRIVE WITH HEAD-GIMBAL ASSEMBLY AND CONTACT PLATE

CROSS-REFERENCE TO RELATED APPLICATIONS

This application is a divisional of U.S. patent application Ser. No. 17/230,654, filed Apr. 14, 2021, which is a continuation of U.S. patent application Ser. No. 16/864,050, filed Apr. 30, 2020, now issued as U.S. Pat. No. 11,087,786, both of which are herein incorporated by reference.

BACKGROUND OF THE DISCLOSURE

Field of the Disclosure

Embodiments of the present disclosure generally relate to a tape embedded drive having a head-gimbal assembly (HGA) and a contact plate.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is linear tape open (LTO), which comes in a variety of densities.

Tape drives operate by using a tape head to record and read back information from tapes by magnetic processes. The tape head comprises servo elements and data elements that are arranged in an array that is oftentimes referred to as a tape head array.

In operation, the tape drive system uses an up/down stepping motor and voice coil motor (VCM), called dual stage motors, to move a large writer and reader head bar. The tape may stretch and move and thus not properly align with the tape head during read and/or write operations. Furthermore, the track spacing between adjacent data tracks can be different due to the stretching and/or moving of the tape.

Therefore, there is a need in the art for an improved tape drive that can correct tape stretching or movement.

SUMMARY OF THE DISCLOSURE

The present disclosure generally relates to a tape embedded drive having a head-gimbal assembly (HGA) and a contact plate. By using a support structure or contact plate beneath the tape, read and write heads can be designed to be narrower than the tape. The support structure or contact plate can stretch or relax the tape so that the spacing between servo tracks on the tape corresponds to the servo to servo spacing on the head. HGAs, which are narrower than the tape, can fly over the tape and read data from and write data to the tape. The HGA can have a single head or multiple heads. Additionally, multiple independent head assemblies can also be used for reading from and writing to the same tape.

In one embodiment, a storage device comprises: a first tape reel for unwinding tape media for storing data; a second tape reel for winding the tape media for storing data; a head assembly for reading data from and writing data to the tape media; and a contact plate movable from a first position spaced from the tape media to a second position in contact with the tape media, wherein the tape media is movable from a third position that is spaced a first distance from the head assembly and a fourth position that is spaced a second distance from the head assembly, wherein the second distance is less than the first distance.

In another embodiment, a storage device comprises: a head-gimbal assembly for reading data from and writing data to the tape media, wherein the head-gimbal assembly is configured to fly above the tape media when reading data from and writing data to the tape media.

In another embodiment, a storage device comprises: a first tape reel for unwinding tape media for storing data; a second tape reel for winding the tape media for storing data; means to read data from and write data to the tape media, wherein the means to read data from and write data to the tape media is movable from a first position spaced a first distance from the tape media to a second position spaced a second distance from the tape media, wherein the means to read data from and write data to the tape media reads data from and writes data to the tape media at the second position; and means to move the tape media closer to and farther from the means to read data from and write data to the tape media.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6C are schematic illustrations of a head assembly comprising a head gimbal assembly (HGA), according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape embedded drive having a head-gimbal assembly (HGA) and a contact plate. By using a support structure or contact plate beneath the tape, read and write heads can be designed to be narrower than the tape. The support structure or contact plate can stretch or relax the tape so that the spacing between servo tracks on the tape corresponds to the servo to servo spacing on the head. HGAs, which are narrower than the tape, can fly over the tape and read data from and write data to the tape. The HGA can have a single head or multiple heads. Additionally, multiple independent head assemblies can also be used for reading from and writing to the same tape.

Figure 1A:
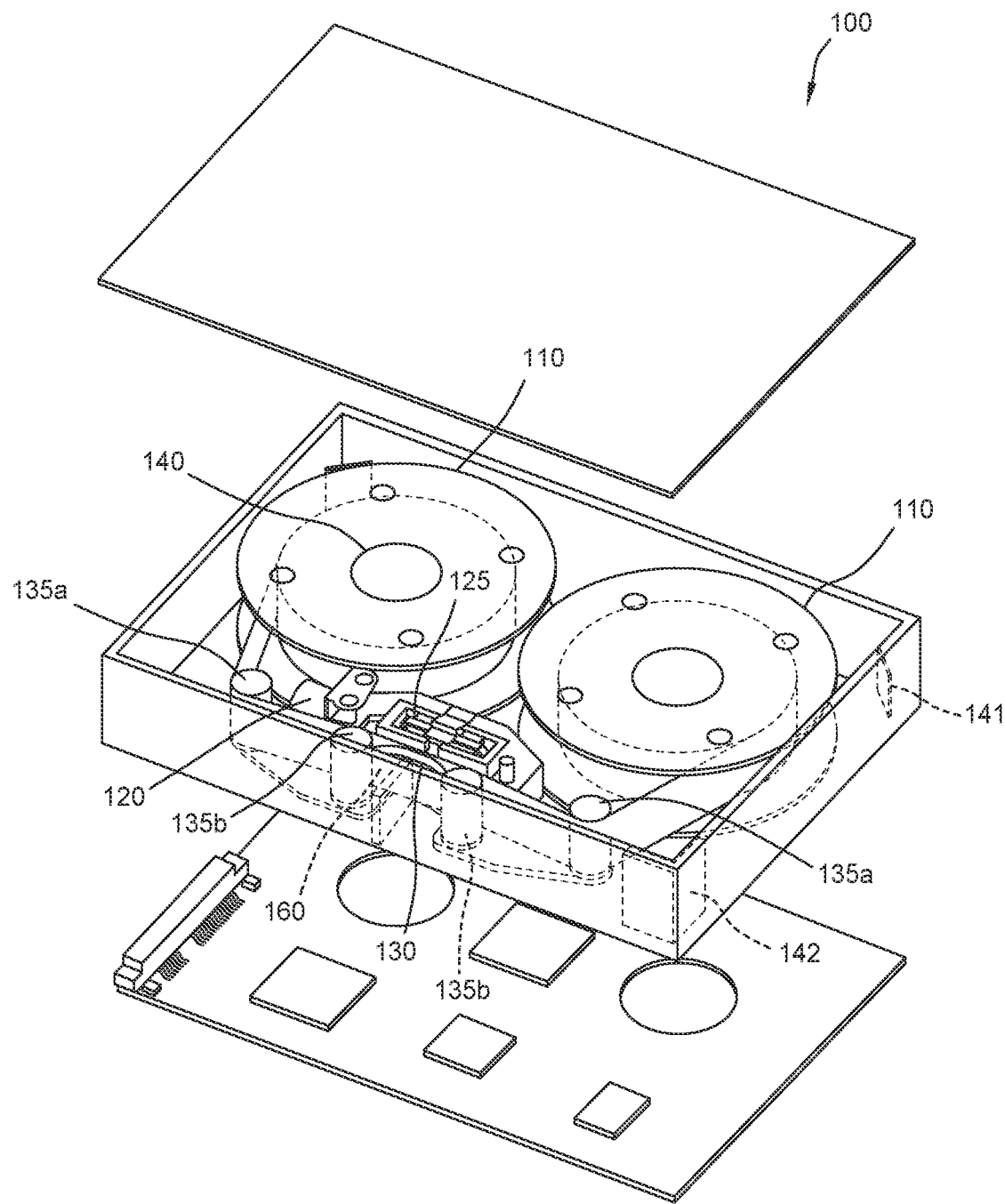
FIGS. 1A-1C are schematic illustrations of a tape embedded drive, according to various embodiments.
Figure 1B:
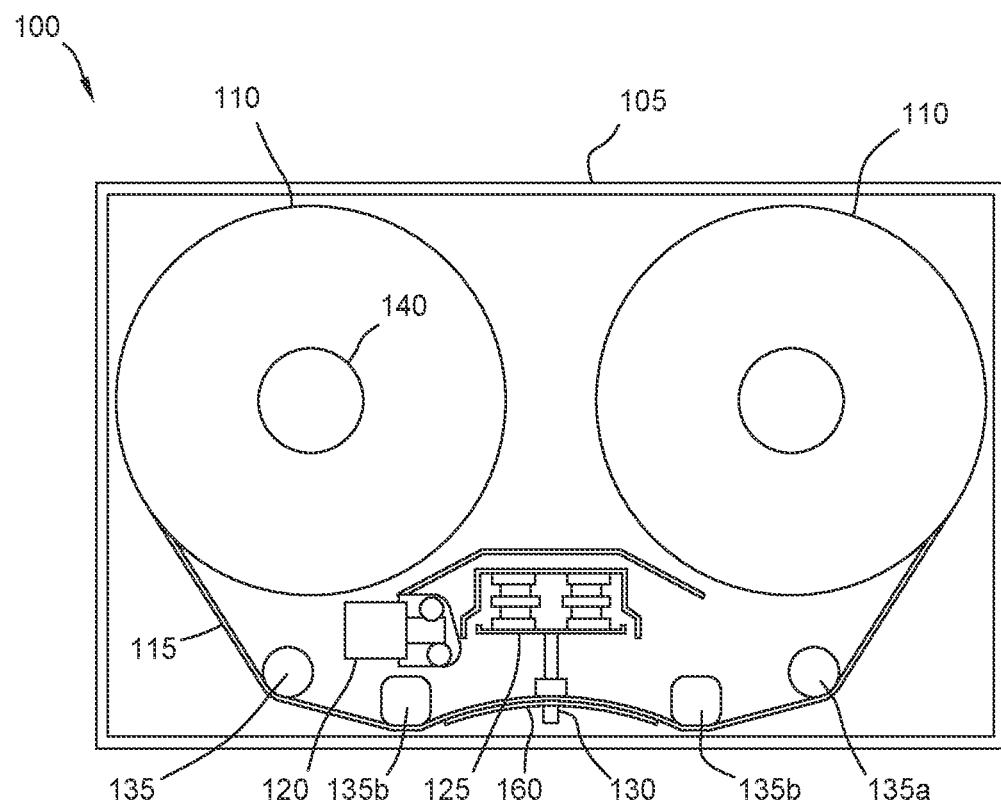
Figure 1C:
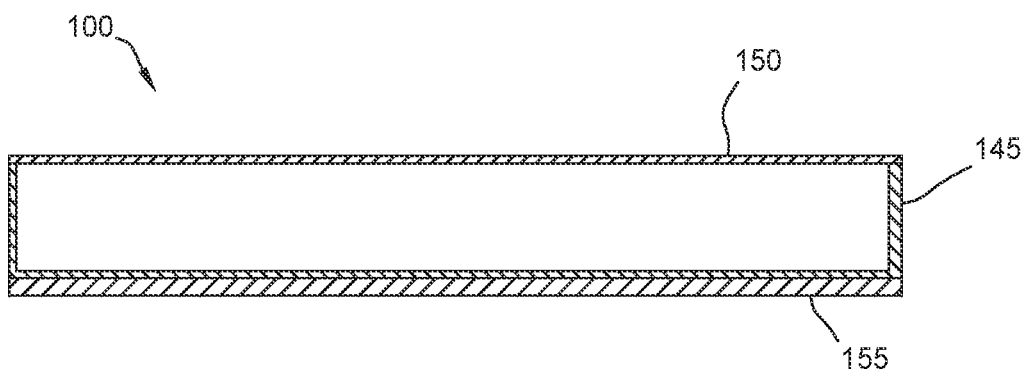

FIGS. 1A-1C are schematic illustrations of a tape embedded drive 100, according to various embodiments. The tape embedded drive, in FIGS. 1A and 1B, comprises a casing 105, one or more tape reels 110, tape media 115, one or more motors (e.g., a stepping motor 120 (i.e., a stepper motor), a voice coil motor (VCM) 125, etc.), a head assembly 130 with one or more read and write heads, a contact plate 160, and tape guides/rollers 135a, 135b. The tape media 115 may be referred to as tape media 115 for exemplary purposes. In FIG. 1C, the printed circuit board assembly (PCBA) 155 is mounted on an external surface of the casing.

In FIG. 1B, two tape reels 110 are placed in the interior cavity of the casing 105, with the center of the two tape reels 110 in-line with one another and on the same level in the cavity and with the head assembly 130 located in the middle and below of the two tape reels 110. Tape reel motors 140 located in the spindles of the tape reels can operate to wind and unwind the tape media 115 in the tape reels. Each tape reel 110 may also incorporate a tape folder to ensure the tape media 115 is wound neatly onto the reel 110. The tape media 115 may be made via a sputtering process to provide improved areal density.

Tape media 115 from the tape reels 110 are biased against the guides/rollers 135a, 135b, collectively referred to as guides/rollers 135, with the two guides/rollers 135a furthest away from the head assembly 130 serving to change the direction of the film and the two guides/rollers 135b closest to the head assembly 130 pressing the tape media 115 towards the head assembly 130.

As illustrated in FIG. 1A, the guides/rollers 135 on the same side (i.e., left or right of the center axis of the long edge of the device) utilize the same structure. In FIG. 1B, the guides/rollers 135 may have more specialized shapes and differ from each other based on function. The number of guides/rollers 135 illustrated in FIGS. 1A and 1B are not intended to be limiting, and a greater or a lesser number of rollers may be used in other embodiments. For example, the two function rollers may be cylindrical in shape, while the two functional guides may be flat-sided (e.g., rectangular prism) or clip shaped with two prongs and the film moving between the prongs of the clip.

The VCM 125 and the stepping motor 120 may variably position the one or more read/write tape heads transversely with respect to the width of the tape media 115. The stepping motor 120 may provide coarse movement of the one or more read/write tape heads while the VCM 125 may provide finer actuation of the one or more read/write tape heads. In one embodiment, servo data can be written to the tape to aid in more accurate positioning of the one or more write/read heads along the tape film.

The contact plate 160 may comprise various mechanics to provide support to the backside (i.e., opposite of the writing side) of the tape media 115 when writing to or reading from the tape media 115. By utilizing the contact plate 160 to support the backside of the tape media 115, the less tension may be applied to the tape media 115, thus lengthening the lifespan of the tape media 115.

In FIG. 1A, the casing 105 comprises one or more particle filters 141 and/or desiccants 142 to help maintain the environment in the casing. For example, if the casing is not airtight, the particle filters 141 and/or desiccants 142 may be placed where airflow is expected. The particle filters 141 and/or desiccants 142 may be placed in one or more corners or in one or more locations away from the moving internal components. For example the moving reels 110 may generate internal airflow as the tape media 115 winds/unwinds, and the particle filters 141 and/or desiccants 142 may be placed within the generated internal airflow.

The placement of the internal components within the casing 105 of the tape embedded drive 100 may be different according to various embodiments. For example, in one embodiment, the head assembly 130 is internal to the casing 105, such that the tape media 115 is not exposed outside of the casing 105, such as in conventional tape drives. Thus, the tape film does not need to be routed along the edge of the casing and can be freely routed in more compact or otherwise more efficient ways within the casing. The one or more read/write tape heads and tape reels 110 may be placed in a variety of locations to achieve a more efficient layout, as there is no design requirement to provide external access to the previously mentioned components.

In FIG. 1C, the casing 105 comprises a cover 150 and a base 145.

The PCBA 155 is attached to the bottom of the external surface of the casing 105 and opposite of the cover 150. Since the PCBA 155 is made of solid state electronics and may be more durable to the environment, the PCBA 155 does not need to be placed inside the casing 105. However, in some embodiments, the PCBA 155 is placed inside the casing 105. The placement of the PCBA 155 on the outside of the casing 105 releases space within the cavity of the tape embedded drive 100 that would otherwise be occupied by the PCBA 155. The space released by the placement of the PCBA 155 may be utilized to place other components, such as filters 141 and/or desiccants 142 to better protect to the internal environment of the tape embedded drive 100.

Figure 2:
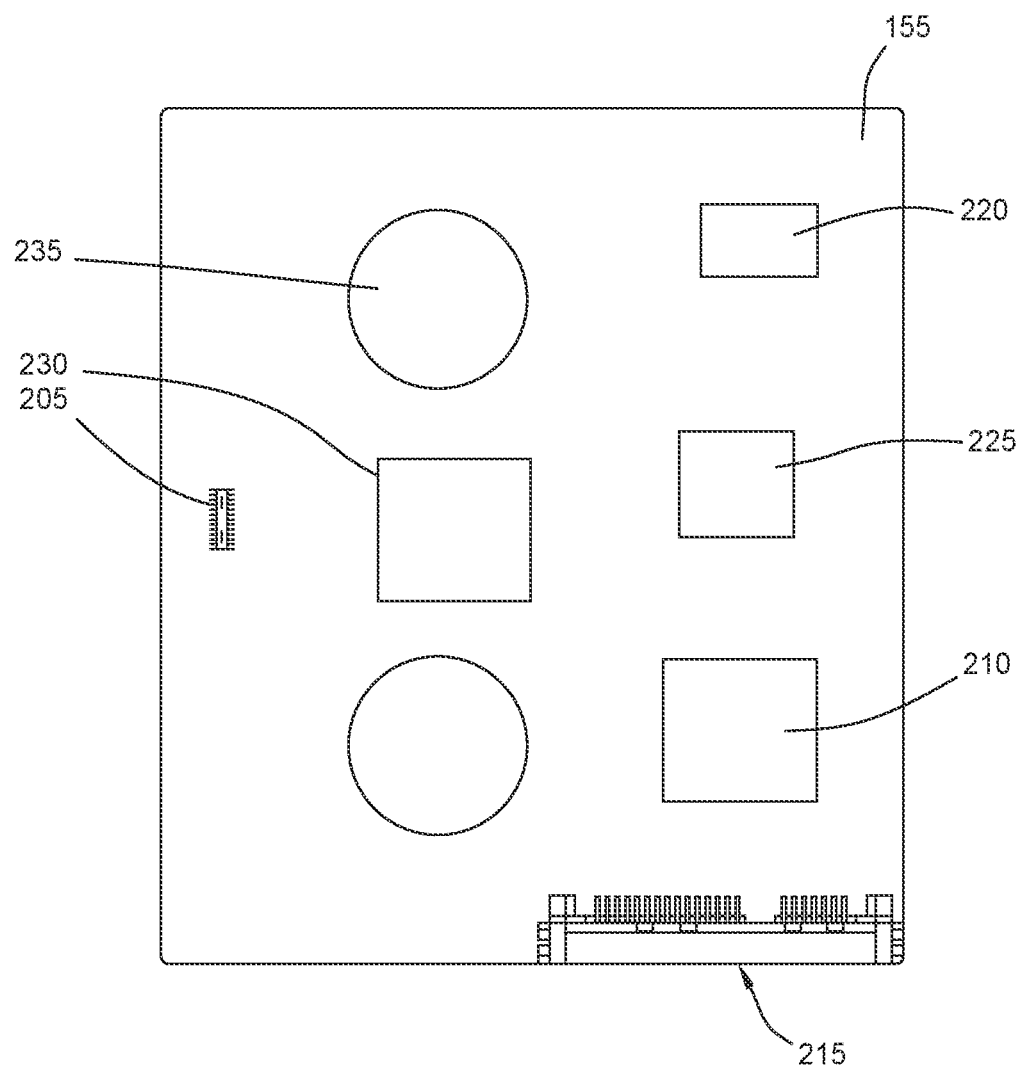
FIG. 2 is a schematic illustration of a Printed Circuit Board Assembly (PCBA), according to one embodiment.

FIG. 2 is a schematic illustration of a Printed Circuit Board Assembly (PCBA), according to one embodiment. The PCBA 155 is attached to the bottom surface of the casing, with a connector 205 attaching to contacts or an interface on the bottom surface electrically/electronically connected to internal components in the casing. For example, the contacts or the interface may be electronically connected to one or more motors, such as the VCM 125 and the stepping motor 120 of FIG. 1, and/or actuators within the casing, such as the casing 105 of FIG. 1. In one embodiment, the contacts/interface are built into the casing 105 without comprising the hermetically sealed casing 105. In another embodiment, the connector 205 can be electrical feedthrough electrically connecting components inside the casing 105 to those on the PCBA 155, while maintaining the hermetic seal of the casing 105.

The PCBA 155 comprises various components, such as one or more controllers, one or more connectors 205, system on chip (SoC) 210, one or more data interfaces 215 (e.g., Serial ATA (SATA), Serial attached SCSI (SAS), non-volatile memory express (NVMe), or the like), memory 220, Power Large Scale Integration (PLSI) 225, and/or data read channel controller 230. One or more cutouts 235 may be added to the PCBA 155 to provide additional space for tape reel motors, such as the tape reel motors 140 of FIG. 1. For example, the portion of the casing 105 above the tape reel motors 140 may be raised to provide additional space for the motors. The cutouts 235 may allow for the reduction of the thickness of the tape embedded drive 100 as the PCBA 155 may surround the raised portion of the casing 105.

The PCBA 155 may extend along the entire bottom exterior surface of the casing 105 or may only partially extend along the surface, depending on the space requirements of the various tape embedded drive components. In some embodiments, a second PCBA (not shown) may be located internally in the casing 105 and be in communication with the first PCBA 155, for example, via the connector 205.

In various embodiments, a controller on the PCBA 155 controls the read and write operations of the tape embedded drive 100. The controller may engage the tape reel motors 140 and cause the tape reels 110 to wind the tape media 115 forwards or backwards. The controller may further use the VCM and the stepping motor, such as the VCM 125 and the stepping motor 120 of FIG. 1, to control the placement of the one or more read/write tape heads above the tape media 115. The controller may also control the input/output of data to or from the tape embedded drive 100 through one or more interfaces 215, such as SATA or SAS.

Figure 3:
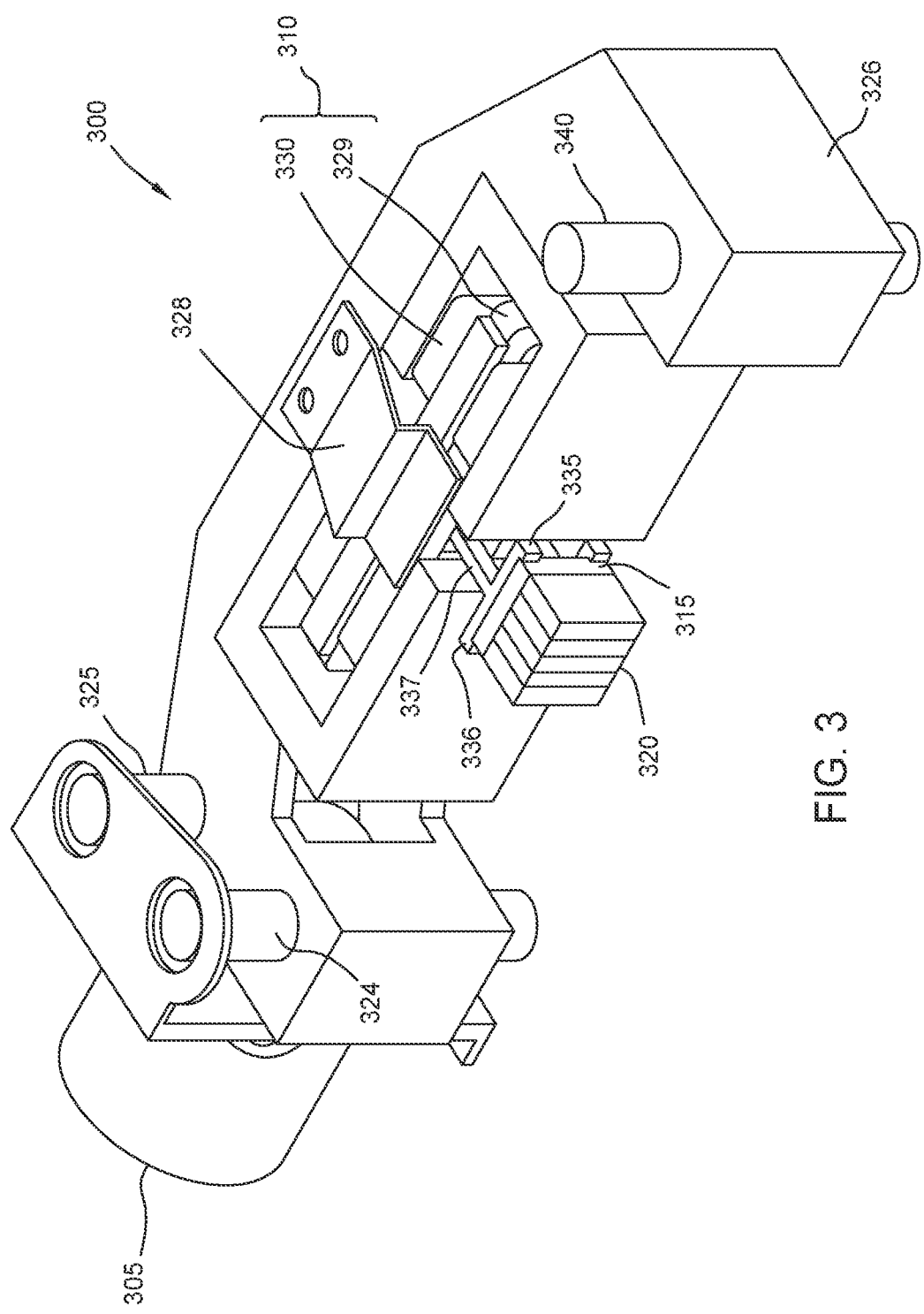
FIG. 3 is a schematic illustration of a head assembly of a tape embedded drive, according to one embodiment.

FIG. 3 is a schematic illustration of a head assembly 300 of a tape embedded drive 100, according to one embodiment. The head assembly 300 comprises a multi-stage actuator for moving the head assembly 300. In some embodiments, the multi-stage actuator comprises a stepping motor 305 (first stage), which may provide coarse actuation, a voice coil motor 310 (second stage) comprising a coil 329 and magnet 330, which may provide fine actuation, and a piezoelectric actuator 315 (third stage), which may provide ultra-fine actuation for up/down movement of a head bar 320. In one embodiment, the piezoelectric actuator 315 is a lead zirconate titanate (PZT) actuator (e.g., shear PZT). By using a 3-stage motor, the movement of the head bar 320 can be more precise. With greater precision, more channels can be supported on the tape film, potentially allowing for greater data density on the tape media 115. In one embodiment, the head bar 320 comprises heads in a write-read-write layout, similar in layout to conventional tape heads. In another embodiment, the head bar 320 comprises two heads in a read-write layout, similar in layout to HDD heads.

The head assembly 300 further comprises a screw shaft 325 coupling an actuator block 326 to the stepping motor 305. The screw shaft 325 and guide shafts 324, 340 may facilitate movement of the actuator block by the stepping motor 305. In some embodiments, a different number of guide shafts 324, 340 are used (e.g., 0, 1, 3+). For example, smaller or lighter actuator blocks may need less support during movement and use only one or even no guide shafts. Meanwhile, larger or heavier actuator blocks may use additional guide shafts or multiple screw shafts.

A suspension assembly 328 couples the head bar 320 to the actuator block 326. In one embodiment, the suspension assembly 328 comprises a mounting plate, a load beam, and a laminated flexure to carry the electrical signals to and from the read and write heads in the head bar 320. The suspension assembly 328 comprising a coil 329 through which a controlled electrical current is passed. The coil 329 interacts with one or more magnets 330 attached to the actuator block 326 to form a voice coil motor 310 to controllably move the head bar 320.

In one embodiment, a head support block 335 couples the head bar 320 and piezoelectric actuator 315 to the suspension assembly 328. The head support block 335 comprises a clamp 336 to secure the head bar 320 and the piezoelectric actuator 315 to a supporting structure 337 perpendicular to the clamp 336 to couple the base to the suspension assembly 328. In another embodiment, the head support block 335 and the actuator 315 form a suspension system that allows the head bar 320 to move across the width of the tape media 115, in conjunction with the control provided by the VCM 310 and the stepping motor 305.

In one embodiment, the piezoelectric actuator 315 may optionally be a multilayer piezoelectric element, comprising a plurality of piezoelectric material layers sandwiched between conductive (e.g., gold) electrode layers. In another embodiment, the piezoelectric actuator 315 may optionally comprise one or more of the many known piezoelectric materials, such as lead zirconate titanate, lead scandium tantalate, lanthanum gallium silicate, lithium tantalite, barium titanate, gallium phosphate, and/or potassium sodium tartrate.

In one embodiment, the piezoelectric actuator 315 extends or contracts along a second axis. The actuator 315 may push the head bar 320 towards the tape media 115 or pull the head(s) away from the tape media 115. In one embodiment, a heater (e.g., heating coil) may be incorporated into the head bar 320 in order to cause the one or more read/write heads to move closer to the tape film. A touchdown sensor may also be incorporated into the head bar 320 to detect head-film contact and prevent the head bar from touching the tape media 115.

By allowing the one or more read/write heads to move closer to the tape film, the signal strength can be increased. In addition, by allowing the head bar 320 to move away from the tape media 115, a fast-forward or fast-rewind function may be enabled for the tape embedded drive 100. As the head bar 320 is further away from the media, the chances of the media hitting the head bar is decreased even if the tape media 115 is moving faster. By avoiding contact, the reliability of the read/write heads and/or the tape media 115 is maintained.

In order to better secure the head assembly 300 to the casing 105, a second guide shaft 340 may be used. In one embodiment, the first guide shaft 324 is on one side of the actuator block 326 with the second guide shaft 340 on the opposite end of the actuator block 326.

In one implementation, movement of the head bar 320 is accomplished in a 3-stage action. First, the stepping motor 305 rotates the screw shaft 325, causing the actuator block 326 to move up and down the first guide shaft 324 and the second guide shaft 340. The head bar 320 moves across (i.e., up and down) the width of a tape media 115. When a current is applied to the VCM coil, the head support block 335 moves in the similar fashion (i.e., up and down the width of the tape media 115) as the head bar 320, while being supported by the suspension assembly 328. When a voltage is applied to the piezoelectric actuator 315, the one or more read/write heads move across (i.e., up and down) the width of the tape media 115. Working in tandem, the 3-stage action can move the head bar 320 across (i.e., up and down) the width of the tape film in coarse, fine, or ultra-fine increments. In one embodiment, the 3 stages of movement proceed at around a 30,000/10,000/1 ratio, with the stepping motor 305 capable of moving up to about 12.65 mm, the VCM 310 capable of moving up to about 4 mm, and the piezoelectric actuator 315 capable of moving up to about 0.4 μm.

Figure 4A:
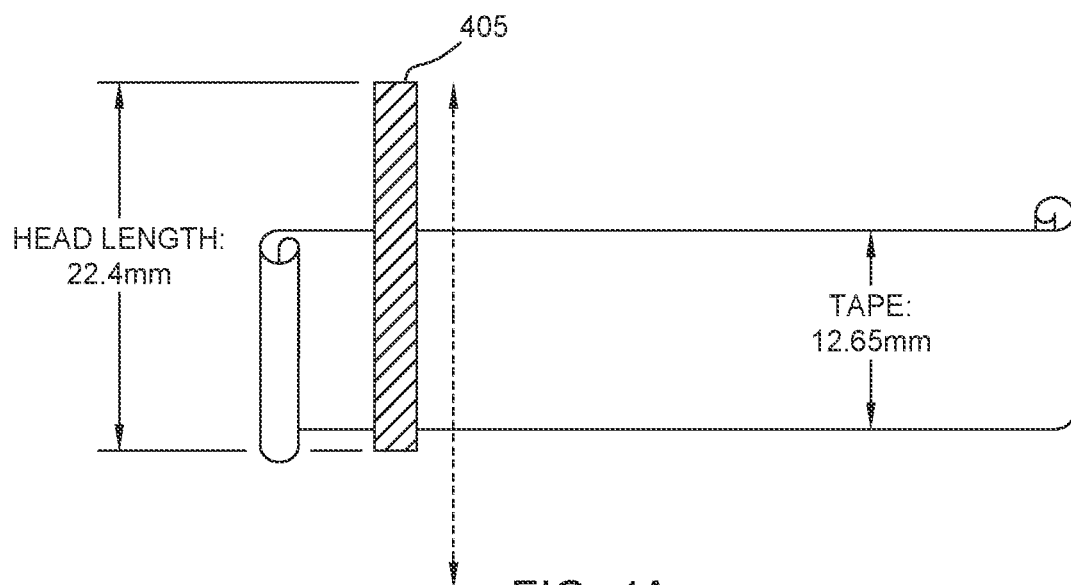
FIGS. 4A and 4B are schematic illustration of a linear tape-open (LTO) head bar and a head bar for the tape embedded drive, according to one embodiment.

FIG. 4A is a schematic illustration of a linear tape-open (LTO) head bar 405 and a head bar 410 for the tape embedded drive, according to one embodiment. LTO cassettes comprise a stepping motor, such as the stepping motor 120 of FIG. 1 or the stepping motor 305 of FIG. 3, and a VCM, such as the VCM 125 of FIG. 1 or the VCM 310 of FIG. 3, to actuate the head bar 410. In one embodiment, FIG. 4A illustrates the relationship between tape width and tape head bar length for LTO.

Multiple writers and readers may be located in a head bar. For example, a tape bar may have 1-10 reader heads and/or 1-10 writer heads. Typically, a tape head bar uses a writer-reader-writer layout. However, other layouts, such as writer-reader-reader-writer may be used. In various embodiments, using two or more readers provides better signal-to-noise ratio (SNR), allowing for higher TPI.

Tape recording uses head film contact technology for recording. Typically, an LTO tape uses four data bands on the film, in which the one or more read/write heads are moved to four different locations up and down the width of the tape. The stepping motor is used to move the head bar to each of the four locations, with the voice coil motor handling finer actuation within each location. Thus, an LTO cassette uses a longer head bar length (e.g. 22.4 mm) than the tape width (e.g. 12.65 mm), so that the tape width is covered by the head bar in each of the four possible locations that the stepping motor may move the head bar.

Due to the heavy mass of the longer head bar 405, wider head reader width and limited movement granularity of the stepping and voice coil motors, the track density on the film for an LTO cassette is limited. An LTO-7 track pitch is about 10.7 k TPI (2.37 um).

In one embodiment, the tape embedded drive 100 comprises a significantly smaller head bar 410 than an LTO head bar 405, such as a head bar 410 of about 4 mm in length. With a shorter head bar length and corresponding less mass, the head bar can be moved up and down by PZT ultra-fine actuation. In one embodiment, the head assembly, such as the head assembly 130 of FIG. 1 or the head assembly 300 of FIG. 3, is attached to the PZT actuator, such as the PZT actuator 315 illustrated in FIG. 3, which is located on an assembly attached to an actuating portion of the voice coil motor, which in turn is on an assembly attached to an actuating portion of the stepping motor. In one embodiment, the PZT actuator 315 is moved by the VCM and the VCM is in turn moved by the stepping motor.

While the above discusses head bar sizes of about 4 mm, other sizes are possible, such as about 3 mm, about 5 mm, or even other sizes. In some embodiments, the head bar is significantly smaller than the tape width. For example, the head bar may be less than half or even less than a quarter of the width of the tape media.

Figure 4B:
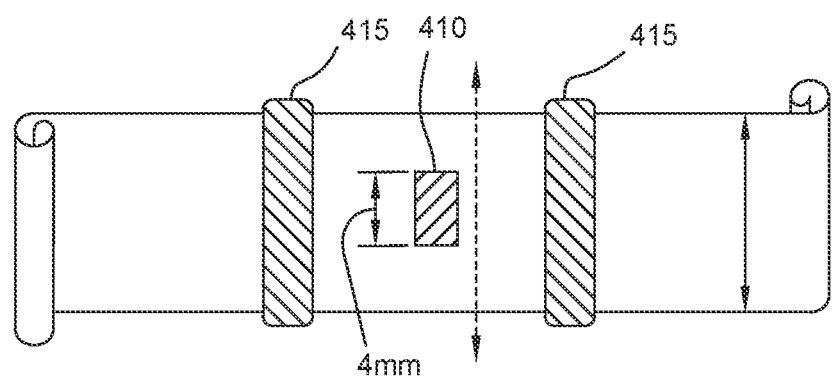

In one embodiment shown in FIG. 4B, two tape guides 415 are located on both sides of the tape assembly. The tape guides 415 limit the movement of the tape media, such as the tape media 115 of FIG. 1, and provide better stability when the head assembly is moving over the tape media 115. In another embodiment, a single tape guide placed either before or after the head assembly may be utilized.

The head bar 410 may be supported by an HDD-like gimbal assembly or suspension assembly, such as the gimbal assembly illustrated in FIG. 3. The assembly may provide gentler and/or more stable head to film contact, potentially providing better reliability for reading and/or writing. The suspension assembly may use a variety of materials, such as stainless steel or the like.

Figure 5A:
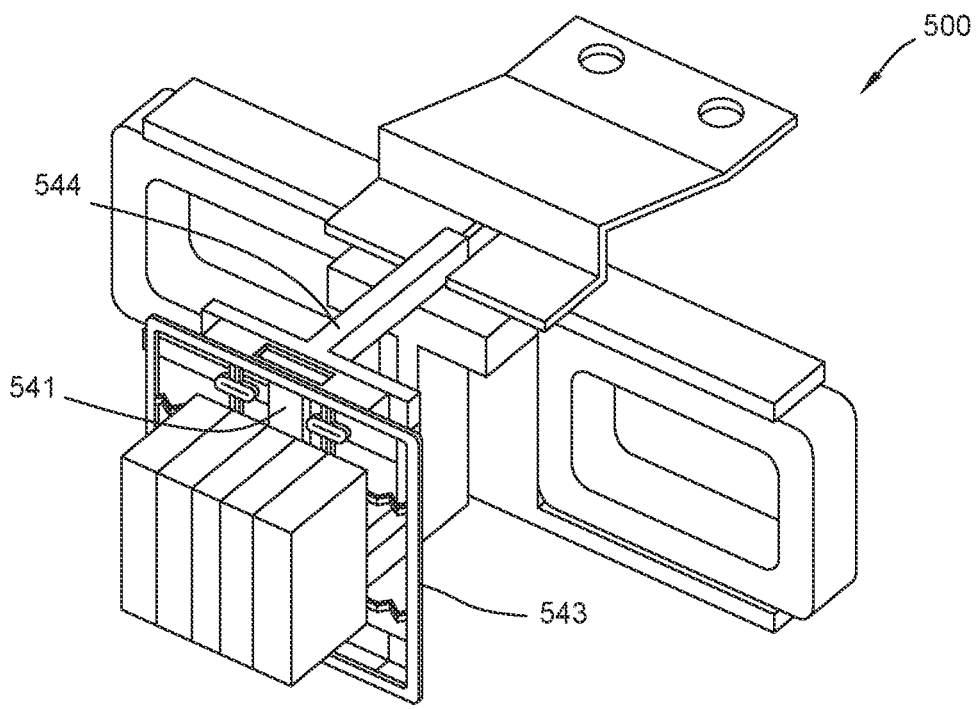
FIGS. 5A-5B are schematic illustrations of a head assembly using a push-pull suspension system, according to various embodiments.
Figure 5B:
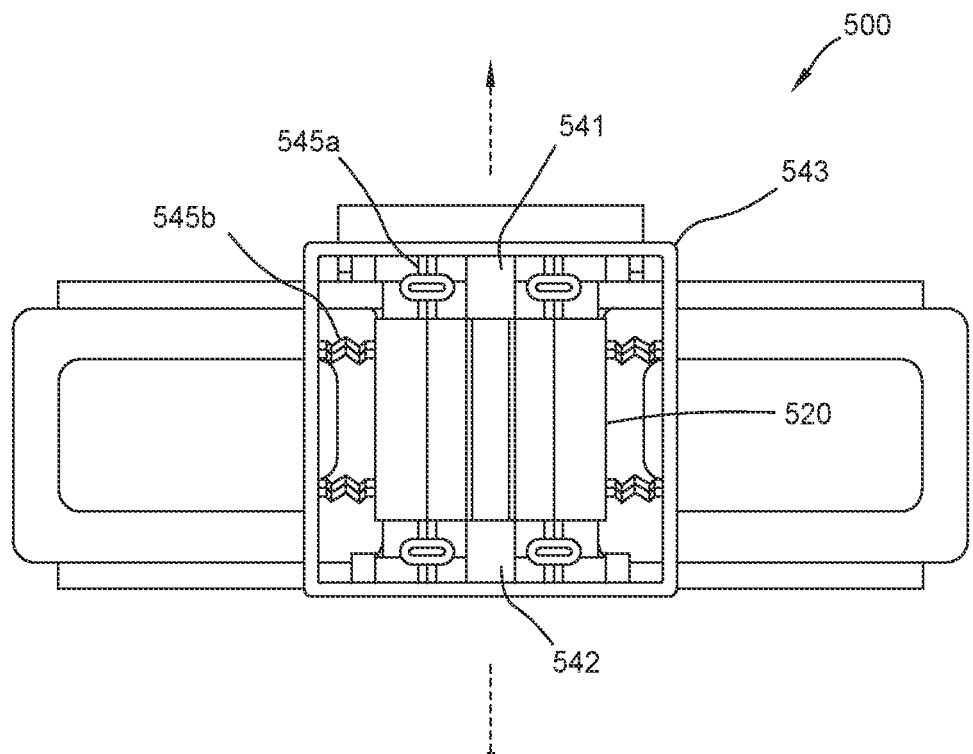

FIGS. 5A-5B are schematic illustrations of a head assembly 500 using a push-pull suspension system, according to various embodiments. Push-pull actuators generally use less voltage than shear actuators. The push-pull suspension system comprises a push actuator 541, a pull actuator 542, and a frame 543. In one embodiment, the push actuator 541, the pull actuator 542, and a plurality of suspension wires connect the head bar 520 to the frame 543 connected to a support structure 544.

Working in tandem, the push actuator 541 and pull actuators 542 may move the suspended head bar 520 up and down relative to the width of the tape, as illustrated by the dashed arrows in FIG. 5B. For example, when the push actuator 541 contracts, the pull actuator 542 expands, thereby pushing the head bar 520 to one direction (up). When the push actuator 541 expands and the pull actuator 542 contracts, the head bar 520 is pushed in the opposite direction (down). In one embodiment, the push actuator 541 and pull actuator 542 are PZTs.

The suspension system can also comprise wire suspensions 545a, 545b for movably supporting the one or more read/write heads. In one embodiment, the wire suspensions 545a, 545b are made of a flexible material that can be easily moved by the push actuator 541 and pull actuator 542. In the illustrated embodiment, two suspension wires are placed on each side of the one or more read/write heads.

The design of the wire suspensions may be different to account for the desired movement of the head bar 520. For example, the push/pull actuators 541, 542 are moving the head bar 520 across the width of the tape media, such as the tape media 115 of FIG. 1, as illustrated by the dashed arrows. In one embodiment, a first wire suspension type 545a is configured to facilitate the up-down movement, for example, by having a loop section configured to compress along the up-down movement. In one embodiment, a second wire suspension type 545b is configured to reduce lateral movement during the up-down movement. For example, the second suspension wire may be stiffer, utilize a higher tensile material, and/or utilize a shape (e.g., a "W" shape) that reduces compression along the direction perpendicular to the up-down motion. In one embodiment, the push-pull actuator designs used in HDDs may be adapted for use in the tape embedded drives 100, as described above, due the high reliability and low production cost of the push-pull actuator designs.

FIGS. 6A-6C are schematic illustrations of a head assembly 600 comprising a head gimbal assembly (HGA) 650 adapted from HDD HGAs, according to various embodiments. FIG. 6C is a side profile view of FIG. 6B rotated 90 degrees along an axis. The HGA 650 comprises an elongated suspension 651 comprising a top end and a base end. The suspension 651 may support, on its top end, one or more heads 620 and one or more head sliders with an air bearing system 652.

The elongated suspension 651 may be connected, at its base end, to a supporting structure 653 by one or more actuators 654, 655 and a spring-type clamp 656. In the illustrated embodiment, the one or more actuators 654, 655 are a push-pull actuator, with a first actuator 654 and a second actuator 655 connecting the base of the suspension 651 to the spring-type clamp 656 that connects the suspension 651 to the supporting structure 653.

In an embodiment, the first actuator 654 and the second actuator 655 are PZT actuators. As shown in FIG. 6C, when the first actuator 654 expands and the second actuator 655 contracts, the one or more read/write heads move to the left. When the first actuator 654 contracts and the second actuator 655 expands, the head(s) move to the right.

Figure 7A:
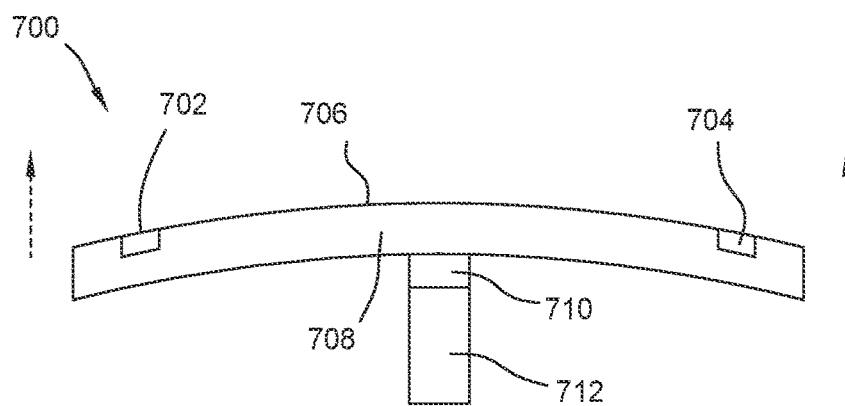
FIGS. 7A-7C are schematic illustrations of a contact plate, according to various embodiments.
Figure 7B:
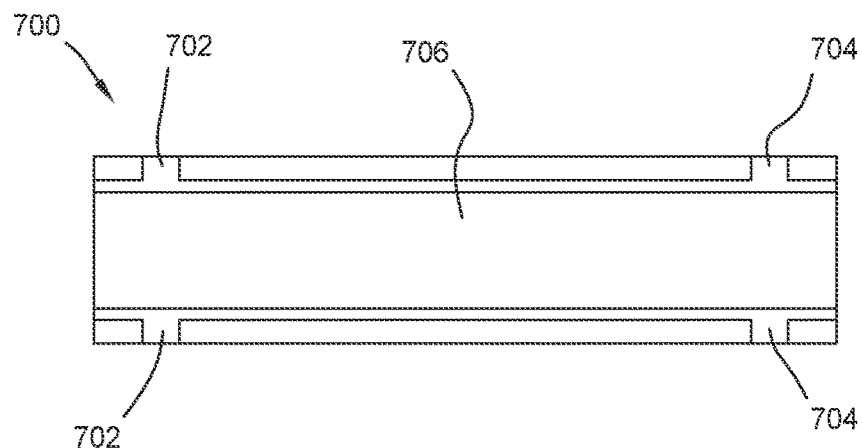
Figure 7C:
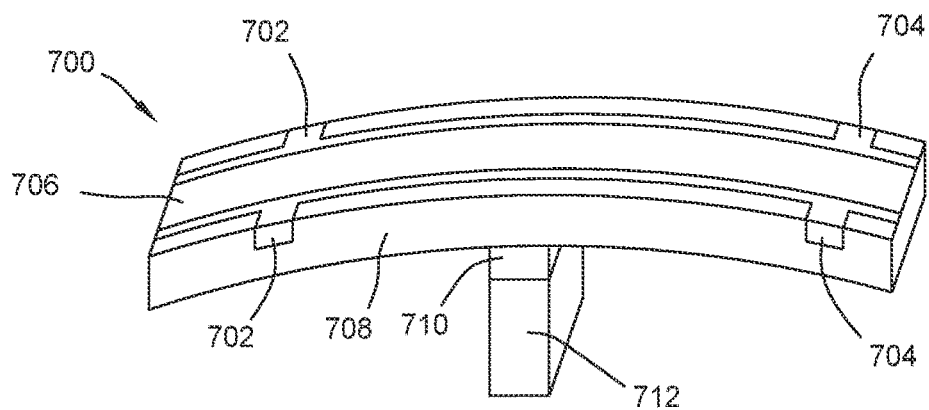

FIGS. 7A-7C are schematic illustrations of a contact plate 700, according to various embodiments. The contact plate 700 may be the contact plate 160 of FIG. 1A and FIG. 1B. The contact plate 700 provides support to the backside of the tape media, such as the tape media 115 of FIG. 1, when a head, such as a flying head or a HDD HGA as illustrated in FIGS. 6A-6C. The term "flying head" may be used interchangeably with HDD HGA for exemplary purposes. The contact plate 700 comprises several elements, such as a first actuator 702 and a second actuator 704 working in tandem, a contact plate 706 of a contact plate structure 708, a base 712 of the contact plate structure 708, and a base mechanical component 710.

The contact plate structure 708 may be formed with any suitable material to provide support to the tape media 115 and the flying head. In one embodiment, the contact plate structure 708 is a flat structure. In another embodiment, the contact plate structure 708 is a curved structure. In yet another embodiment, the contact plate structure 708 is any suitable shape to provide support to the flying head and the tape media 115. The contact plate structure may be moved towards or away from the flying head to provide the appropriate amount of support to the flying head during read/write operations by a base mechanical component 710. The base mechanical component 710 may be an additional feature of the base 712 to maneuver the contact plate structure into an appropriate position.

The contact plate 706 may be coated in a material suitable to reduce and minimize friction as the tape media 115 moves across the surface of the contact plate 706 during a read and/or write operation. In one embodiment, the contact plate 706 width may be a similar size to the tape media described in FIG. 4A. In another embodiment, the contact plate 706 may be wider than the tape media described in FIG. 4A. In yet another embodiment, the contact plate track 706 has a leading edge taper and a trailing edge taper to allow for adjustment. In one embodiment, the contact plate 706 comprises elements to manipulate the tape media 115, such as a heating element. In another embodiment, the contact plate 706 comprises elements to maneuver the tape media 115, such as a tape guide, like the tape guide 615 described in FIG. 4A.

In one embodiment, the first actuator 702 and the second actuator 704 are PZT actuators. Illustrated in FIG. 7A and FIG. 7B, when the first actuator 702 expands and the second actuator 704 contracts, the contact plate 706 tilts in the direction of the second actuator 704. Likewise, when the second actuator 704 expands and the first actuator 702 contracts, the contact plate 706 tilts downwards in the direction of the first actuator 702. The tilting of the contact plate 706 allows for the tension or pressure to be applied to the tape media 115 to provide support for the flying head or the HDD HGA when reading from or writing form the tape media 115.

By using a contact plate as well as a head-gimbal assembly, tape media can be properly read without worry of tape stretching or movement.

It is to be understood that while embodiments discussed herein make reference to a tape drive having two reels, it is contemplated that tape drives having a single reel, along with a contact plate, may be used as well. For example, a read/write head, along with a contact plate, may be disposed in a cartridge or enclosure that may then be inserted into a device. Additionally, the cartridge may have one or two reels disclosed therein. The cartridge is contemplated to be insertable into a device for use.

In one embodiment, a storage device comprises: a first tape reel for unwinding tape media for storing data; a second tape reel for winding the tape media for storing data; a head assembly for reading data from and writing data to the tape media; and a contact plate movable from a first position spaced from the tape media to a second position in contact with the tape media, wherein the tape media is movable from a third position that is spaced a first distance from the head assembly and a fourth position that is spaced a second distance from the head assembly, wherein the second distance is less than the first distance. The head assembly is spaced from the tape media when reading data from and writing data to the tape media. The head assembly is a head-gimbal assembly. The contact plate has a curved surface for contacting the tape media. The contact plate is movable to maintain the second distance as a substantially constant distance while the tape media is moving. The contact plate comprises a piezoelectric material. The storage device includes an enclosure and wherein the first tape reel, the second tape reel, the head assembly, and the contact plate are all disposed within the enclosure.

In another embodiment, a storage device comprises: a head-gimbal assembly for reading data from and writing data to the tape media, wherein the head-gimbal assembly is configured to fly above the tape media when reading data from and writing data to the tape media. The head-gimbal assembly is movable from across the tape media in a direction perpendicular to a direction that the tape media moves during operation. The head-gimbal assembly includes a slider and a magnetic head assembly coupled thereto. The storage device further comprises a suspension coupled to the slider. The storage device further comprises an actuator arm coupled to the slider. The storage device further comprises a voice coil motor coupled to the actuator arm. The storage device further comprises a contact plate, wherein the tape media is configured to move across the contact plate during device operation.

In another embodiment, a storage device comprises: a first tape reel for unwinding tape media for storing data; a second tape reel for winding the tape media for storing data; means to read data from and write data to the tape media, wherein the means to read data from and write data to the tape media is movable from a first position spaced a first distance from the tape media to a second position spaced a second distance from the tape media, wherein the means to read data from and write data to the tape media reads data from and writes data to the tape media at the second position; and means to move the tape media closer to and farther from the means to read data from and write data to the tape media. Both the first position and the second position are spaced from the tape media. The means to move the tape media contacts the tape media. The storage device further comprises means to stretch the tape media. The storage device further comprises an enclosure and wherein the means to read data from and write data to the tape media and the means to move the tape media are disposed within the enclosure. The storage device further comprises means to correct track spacing on the tape media.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a tape reel;
   a tape media coupled to the tape reel; and
   a head-gimbal assembly for reading data from and writing data to the tape media, wherein the head-gimbal assembly is configured to fly above the tape media when reading data from and writing data to the tape media and wherein the head-gimbal assembly comprises:
      a suspension having a base end, a top end, and a longitudinal axis extending from the base end to the top end;
      a slider coupled to the top end of the suspension;
      a magnetic head assembly coupled to a top end of the slider;
      a first actuator coupled to a first side of the base end of the suspension, the first side being disposed in a direction perpendicular to the longitudinal axis; and
      a second actuator coupled to a second side of the base end of the suspension, the second side being opposite the first side, wherein the first and second actuators are piezoelectric push-pull actuators.

2. The storage device of claim 1, further comprising a cartridge, wherein the tape reel, tape media, and head-gimbal assembly are disposed within the cartridge.

3. The storage device of claim 1, wherein the slider is narrower in width than the tape media.

4. The storage device of claim 1, further comprising a stepping motor coupled to the head-gimbal assembly.

5. The storage device of claim 1, wherein the first and second actuators are configured to move the magnetic head assembly in a first direction parallel to a width of the tape media and in a second direction anti-parallel to the first direction.

6. The storage device of claim 1, wherein the first actuator is configured to expand to move the suspension in a first direction, and wherein the second actuator is configured to expand to move the suspension in a second direction opposite the first direction.

7. A storage device, comprising:
   a tape media; and
   a head-gimbal assembly comprising:
      a suspension having a top end, a base end, and a longitudinal axis extending from the base end to the top end;
      a magnetic head assembly disposed on the top end of the suspension for reading data from and writing data to the tape media;
      a first actuator coupled to a first side of the base end, the first side being disposed in a direction perpendicular to the longitudinal axis; and
      a second actuator coupled to a second side of the base end opposite the first side, wherein the first and second actuators are configured to move the magnetic head assembly in a first direction and a second direction opposite the first direction, the first direction being parallel to a width of the tape media and the second direction being anti-parallel to the first direction, wherein the first and second actuators are piezoelectric push-pull actuators.

8. The storage device of claim 7, wherein the head-gimbal assembly is configured to fly above the tape media when reading data from and writing data to the tape media.

9. The storage device of claim 7, wherein the first direction is towards the first side of the base end of the suspension and the second direction is towards the second side of the base end of the suspension.

10. The storage device of claim 7, further comprising a stepping motor coupled to the head-gimbal assembly, wherein the head-gimbal assembly further comprises a slider and an air bearing system disposed on the top end of the suspension.

11. The storage device of claim 7, wherein the first and second actuators are each individually lead zirconate titanate (PZT) actuators.

12. The storage device of claim 7, the suspension is coupled to a supporting structure by a spring-type clamp and the first and second actuators.

13. The storage device of claim 7, further comprising a cartridge, wherein the tape media and the head-gimbal assembly are disposed within the cartridge.

14. A storage device, comprising:
   a tape media; and
   a head-gimbal assembly comprising:
      an elongated suspension;
      a slider disposed on a top end of the elongated suspension;
      a magnetic head assembly disposed on the slider for reading data from and writing data to the tape media;
      means for moving the magnetic head assembly in a first direction and a second direction opposite the first direction, wherein the slider is configured to fly above the tape media when reading data from and writing data to the tape media; and
      means for moving the tape media closer to and farther from the magnetic head assembly.

15. The storage device of claim 14, wherein the head-gimbal assembly further comprises means for coupling the elongated suspension to a supporting structure.

16. The storage device of claim 14, wherein the means for moving the magnetic head assembly in the first direction and the second direction is coupled to a base end of the elongated suspension.

17. The storage device of claim 14, further comprising a stepping motor coupled to the head-gimbal assembly.

18. The storage device of claim 14, wherein the head-gimbal assembly further comprises an air bearing system disposed on the top end of the suspension, and wherein the magnetic head assembly is narrower in width than the tape media.

19. The storage device of claim 14, wherein the first direction is parallel to a width of the tape media and the second direction is anti-parallel to the first direction.

20. The storage device of claim 14, further comprising a cartridge, wherein the tape media and the head-gimbal assembly are disposed within the cartridge.

* * * * *